(12) United States Patent
Yang et al.

(10) Patent No.: US 11,032,723 B2
(45) Date of Patent: *Jun. 8, 2021

(54) SYSTEM AND METHOD FOR INCREASING NETWORK EFFICIENCY USING DYNAMIC REPEAT REQUESTS ADJUSTMENT

(71) Applicant: Verizon Patent and Licensing Inc., Arlington, VA (US)

(72) Inventors: Jin Yang, Orinda, CA (US); Mike Shaojun Li, Boca Raton, FL (US); Ratul K. Guha, Kendall Park, NJ (US); Khaled Elmishad, Walnut Creek, CA (US); Vikram Rawat, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,354

(22) Filed: Jan. 7, 2019

(65) Prior Publication Data
US 2019/0140782 A1 May 9, 2019

Related U.S. Application Data

(63) Continuation of application No. 15/298,787, filed on Oct. 20, 2016, now Pat. No. 10,205,559.

(51) Int. Cl.
*H04W 24/02* (2009.01)
*H04L 12/24* (2006.01)
*H04L 12/26* (2006.01)
*H04L 1/18* (2006.01)

(52) U.S. Cl.
CPC .......... *H04W 24/02* (2013.01); *H04L 1/1825* (2013.01); *H04L 41/5009* (2013.01); *H04L 41/5025* (2013.01); *H04L 43/0852* (2013.01); *H04L 43/16* (2013.01)

(58) Field of Classification Search
None
See application file for complete search history.

(56) References Cited

U.S. PATENT DOCUMENTS

| | | |
|---|---|---|
| 9,179,360 B1 | 11/2015 | Vivanco |
| 2002/0054578 A1 | 5/2002 | Zhang et al. |
| 2002/0188881 A1* | 12/2002 | Liu ............................ G06F 1/10 713/401 |
| 2003/0039231 A1* | 2/2003 | Sinnarajah .............. H04L 1/188 370/335 |
| 2008/0123518 A1 | 5/2008 | Putzolu et al. |
| 2008/0198814 A1* | 8/2008 | Wengerter .............. H04L 47/14 370/336 |

(Continued)

*Primary Examiner* — Andre Tacdiran

(57) ABSTRACT

A computer device may include a memory configured to store instructions and a processor configured to execute the instructions to select a communication session associated with a wireless communication device; determine a service requirement for the selected communication session; determine an end-to-end latency for the selected communication session; and compute a repeat requests adjustment based on the determined service requirement and the determined end-to-end latency. The processor may be further configured to instruct a base station device associated with the communication session to adjust the maximum number of repeat requests transmissions based on the determined repeat requests adjustment.

20 Claims, 11 Drawing Sheets

(56) References Cited

U.S. PATENT DOCUMENTS

| | | | |
|---|---|---|---|
| 2009/0116420 A1* | 5/2009 | Jeong | H04L 1/1877 370/312 |
| 2010/0316008 A1* | 12/2010 | Kim | H04L 5/0044 370/329 |
| 2011/0075579 A1* | 3/2011 | Seymour | H04L 47/283 370/252 |
| 2011/0090853 A1* | 4/2011 | Chandramouli | H04W 28/10 370/329 |
| 2011/0280212 A1* | 11/2011 | Lv | H04W 74/002 370/329 |
| 2012/0047407 A1* | 2/2012 | Tilwani | H04L 1/1848 714/55 |
| 2012/0129530 A1* | 5/2012 | Larmo | H04W 36/02 455/436 |
| 2012/0239998 A1* | 9/2012 | Park | H04L 1/1896 714/748 |
| 2013/0028096 A1 | 1/2013 | Cheng et al. | |
| 2014/0204892 A1* | 7/2014 | Oizumi | H04L 1/1819 370/329 |
| 2014/0286295 A1* | 9/2014 | Liu | H04W 72/10 370/329 |
| 2015/0222549 A1* | 8/2015 | Kakadia | H04L 43/0852 370/231 |
| 2015/0312371 A1* | 10/2015 | Han | H04W 4/70 370/281 |
| 2015/0319746 A1* | 11/2015 | Lu | H04W 72/042 370/280 |
| 2016/0037365 A1* | 2/2016 | Makrakis | H04L 1/00 370/252 |
| 2016/0205540 A1 | 7/2016 | Wu | |
| 2016/0269150 A1* | 9/2016 | Jiang | H04L 1/1861 |
| 2016/0295516 A1 | 10/2016 | Su et al. | |
| 2017/0134992 A1* | 5/2017 | Koskinen | H04L 1/1838 |
| 2018/0176753 A1* | 6/2018 | Kim | H04W 72/042 |

\* cited by examiner

SYSTEM AND METHOD FOR INCREASING NETWORK EFFICIENCY USING DYNAMIC REPEAT REQUESTS ADJUSTMENT

CROSS REFERENCE TO RELATED APPLICATIONS

This application is a continuation of U.S. patent application Ser. No. 15/298,787 filed on Oct. 20, 2016, the contents of which are hereby incorporated herein by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices. In order to maintain a quality of service across a network, or across multiple networks, the provider may need to take into account various conditions that vary across networks and/or devices.

DETAILED DESCRIPTION OF PREFERRED EMBODIMENTS

The following detailed description refers to the accompanying drawings. The same reference numbers in different drawings identify the same or similar elements.

Figure 1:
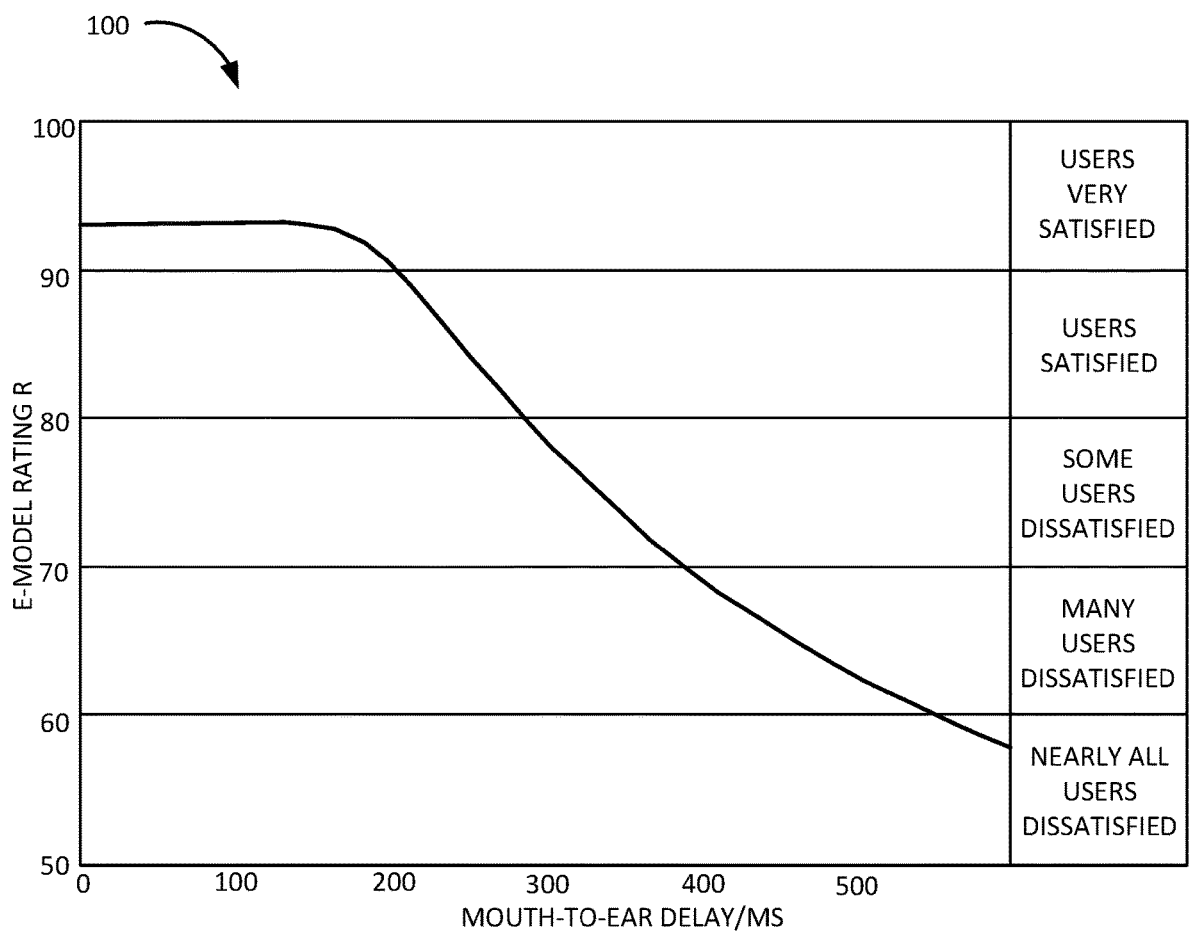
FIG. 1 is a diagram illustrating a relationship between latency and user satisfaction according to an implementation described herein.

FIG. 1 is a diagram illustrating a graph 100 of relationship between latency and user satisfaction according to an implementation described herein. As shown in FIG. 1, a mouth-to-ear delay, also referred to herein as an end-to-end latency, may be expressed in the number of milliseconds (ms) that it takes a signal to traverse a path from a first wireless communication device to a second wireless communication device. User satisfaction, expressed as an E-model rating R in graph 100, is mapped as a function of the mouth-to-ear delay, with a higher R rating corresponding to higher user satisfaction. As shown in graph 100, as the mouth-to-ear delay increases, the user satisfaction decreases. Therefore, providers of wireless communication services may seek to reduce mouth-to-ear delay, or end-to-end latency, in order to improve user satisfaction. Furthermore, an empirical curve, such as shown in FIG. 1, may be used to establish service requirements, in terms of acceptable latency thresholds, in order to meet a particular level of user satisfaction. For example, a maximum mouth-to-ear delay of 300 ms may be set for acceptable voice quality.

Error control methods in wireless communication may include the use of repeat requests, such as an Automatic Repeat Request (ARQ). In an ARQ process, if a sender does not receive acknowledgement of successful receipt of a transmission from a receiver before a timer expires, the sender may re-transmit a data unit (e.g., a frame, a packet, a resource block, etc.) a predefined number of times until an acknowledgement of successful receipt of a transmission is received. A type of ARQ process used in wireless communication is a hybrid ARQ (HARQ). In HARQ, forward error correction (FEC) is used in combination with ARQ for error control. Thus, in HARQ, the data to be transmitted is encoded with a FEC code.

In a wireless communication network, a HARQ number may be set to indicate the allowed maximum number of HARQ transmissions. Increasing the maximum number of HARQ transmissions may result in an increase in coverage, as user equipment (UE) devices further away from a base station may be able to successfully send data while experiencing poor radio frequency (RF) conditions if allowed more re-transmission attempts. However, increasing the maximum number of HARQ transmissions increases latency, as a higher number of re-transmission attempts may delay the time it takes a signal to traverse a path from a sender UE device to a receiver UE device.

Therefore, a network may set a relatively conservative HARQ number to ensure a sufficiently low latency to maintain voice quality for voice communications and/or to maintain network efficiency. However, the latency in a network may vary significantly. For example, network latency may vary based on a type of communication service, times of day, days of week, network load, types of network connection, geographic area, wireless access network, RF conditions, type of UE devices, and/or other parameters. Thus, dynamically adjusting the HARQ number based on network latency may result in increased network efficiency.

Implementations described herein relate to dynamic repeat requests adjustments. A network optimizing device may adjust a maximum number of repeat requests transmissions, such as the maximum number of HARQ transmissions, based on an end-to-end latency of a communication session. The maximum number of repeat requests transmissions may be adjusted based on a service requirement associated with a service type. A service requirement may specify a latency requirement and the maximum number of repeat requests for a service type may be selected so that the latency requirement may be satisfied.

A network optimization device may be configured to select a communication session associated with a wireless communication device and determine a service requirement for the selected communication session. Determining the service requirement may include determining a service type associated with the selected communication session and determining a latency requirement associated with the determined service type. The network optimizer device may then determine an end-to-end latency for the selected communication session. As an example, the end-to-end latency may be determined by obtaining a packet trace for the communication session and determining the end-to-end latency for the selected communication session based on a time the packet trace took to traverse a path associated with the communication session. As another example, the end-to-end latency may be determined by determining a path of links for the communication session and determining the end-to-end latency based on historical latency values associated with the links.

The network optimization device may then compute a repeat requests adjustment based on the determined service requirement and the determined end-to-end latency and instruct a base station device associated with the communication session to adjust the maximum number of repeat requests transmissions based on the determined repeat requests adjustment. In some implementations, the repeat requests transmissions may correspond to HARQ transmissions. In other implementations, the repeat requests transmissions may correspond to a different type of repeat requests transmissions (e.g., stop-and-wait ARQ, go-back-N ARQ, selective repeat ARQ, etc.). Furthermore, in some implementations, the network optimization device may further instruct the base station device to adjust a packet sequence reorder timer based on the adjusted maximum number of repeat requests transmissions and to adjust a status prohibit timer based on the adjusted packet sequence reorder timer.

In some implementations, the network optimization device may ensure that increasing the HARQ number would not increase the latency above the service requirement. For example, computing the repeat requests adjustment may include determining whether increasing the maximum number of repeat requests transmissions would increase a resulting end-to-end latency above a latency value specified by the service requirement, and increasing the maximum number of repeat requests only if increasing the maximum number of repeat requests transmissions would not increase the end-to-end latency above the latency value specified by the service requirement. The resulting end-to-end latency may be computed based on an empirically generated function that relates values of numbers of repeat requests transmissions to values of latency.

In some implementations, the network optimization device may automatically determine to decrease the HARQ number if the latency is too high. For example, computing the repeat requests adjustment may include determining a repeat requests latency for the maximum number of repeat requests transmissions, determining whether the determined end-to-end latency is greater than a first latency threshold and whether the repeat requests latency is greater than a second latency threshold, and decreasing the maximum number of repeat requests transmissions, in response to determining that the determined end-to-end latency is greater than the first latency threshold and that the repeat requests latency is greater than the second latency threshold.

In some implementations, the network optimization device may select to decrease the HARQ number if the RF signal quality is above a quality threshold (e.g., the RF conditions are good) in order to save network resources. For example, computing the repeat requests adjustment may include determining whether a repeat requests failure rate is below a failure rate threshold and selecting to decrease the maximum number of repeat requests transmissions, in response to determining that the repeat requests failure rate is below the failure rate threshold.

In some implementations, the network optimization device may select to stop increasing the HARQ number if there is no improvement in performance with more transmissions (e.g., the RF conditions are poor). For example, computing the repeat requests adjustment may include computing whether increasing the maximum number of repeat requests transmissions would result in a lower repeat requests failure rate and increasing the maximum number of repeat requests transmissions, in response to computing that increasing the maximum number of repeat requests transmissions would result in the lower repeat requests failure rate.

Thus, in situations of poor coverage or a high rate of dropped calls, the HARQ number may be increased as much as possible while satisfying the service requirements. In case of a delay sensitive service, such as a real-time video service, the HARQ number may be decreased as much as possible as long as a HARQ failure rate threshold is satisfied, in order to reduce the end-to-end latency. Additionally, safeguards may be put in place to maintain the HARQ number in case of good RF conditions or in a case of complicated (e.g., poor) RF conditions.

Although implementations are described herein with respect to adjusting the maximum number of repeat requests transmissions with respect to a particular communication session (e.g., a voice and/or video telephone call, a video streaming session, a real-time audio and/or video feed, an application session, etc.), in other implementations, the maximum number of repeat requests transmissions may be adjusted for a particular type of communication session. For example, the maximum number of repeat requests transmissions may be adjusted for communication sessions of a particular service type (e.g., Quality of Service (QoS) class, sessions associated with a particular application, sessions associated with a particular communication protocol, etc.); for communication sessions associated with a particular type of UE device; for communication sessions associated with a particular network link or a set of network links; for communication sessions associated with a particular RF technology type; for communication sessions associated with a particular wireless access network; for communication sessions in a particular geographic area; for communication sessions during a particular time period (e.g., time of day, day of week, etc.); and/or for any combinations thereof.

Figure 2:
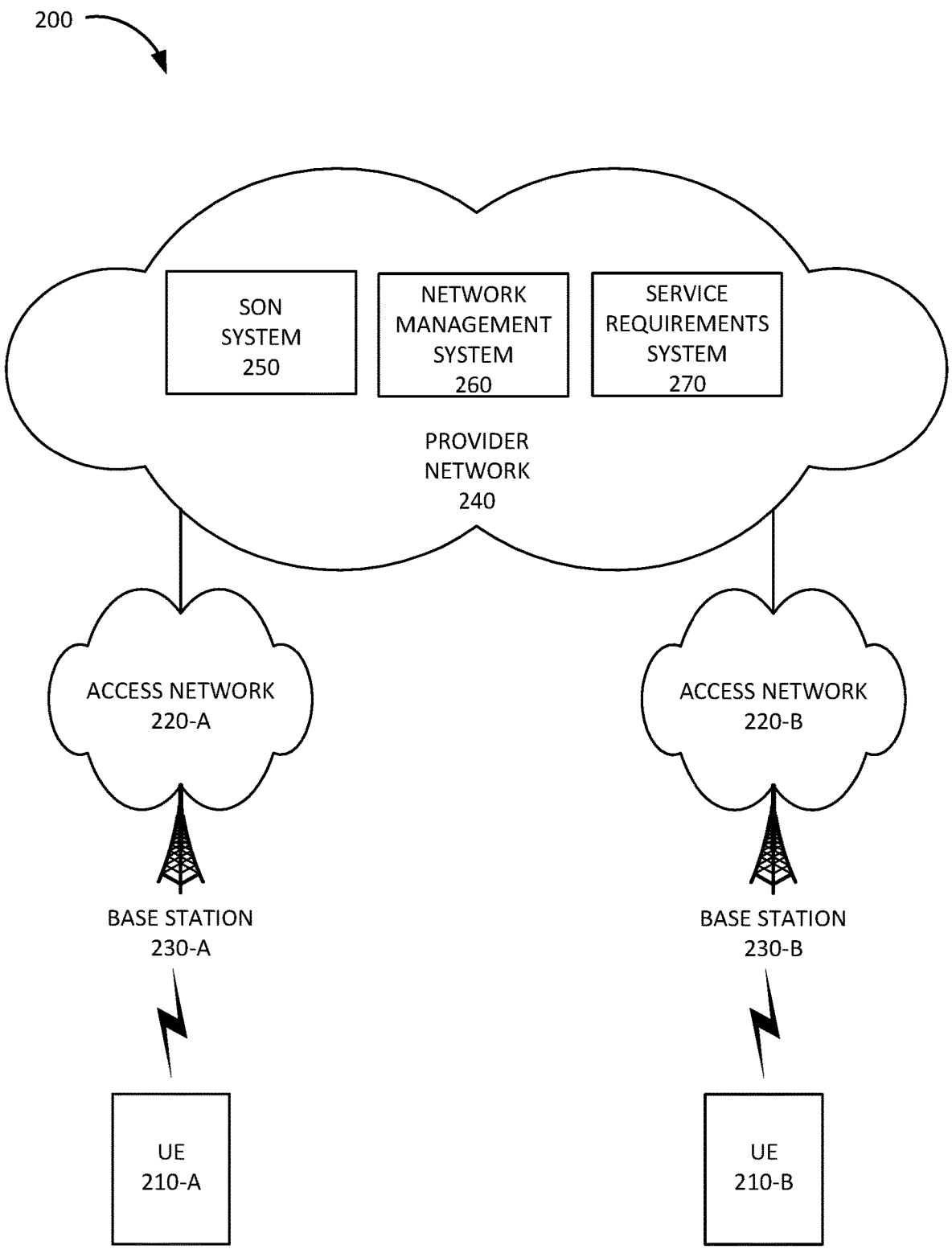
FIG. 2 is a diagram illustrating an environment according to an implementation described herein.

FIG. 2 is a diagram of an exemplary environment 200 in which the systems and/or methods, described herein, may be implemented. As shown in FIG. 2, environment 200 may include UE devices 210-A and 210-B (generically "UE device 210"), access networks 220-A and 220-B, and provider network 240. UE device 210-A may connect to provider network 240 via access network 220-A and UE device 210-B may connect to provider network 240 via access network 220-B. UE device 210-A may establish a communication session with UE device 210-B via access network 220-A, provider network 240, and access network 220-B. In other implementations, UE device 210-A may establish a communication session with another type of device, such as an application server, a UE device 210 connected to provider network 240 via a wired connection, and/or another type of UE device 210.

In some implementations, UE device 210 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a home appliance device; a home monitoring device; and/or any other type of computer device with wireless communication capabilities.

In other implementations, UE device 210 may correspond to an embedded wireless device that communicates wirelessly with other devices over a machine-to-machine (M2M) interface using Machine Type Communication (MTC) and/ or another type of M2M communication. As an example, UE device 210 may be electrically connected to a sensor device, an actuator device, a microcontroller controlling one or more sensors, a microcontroller controlling one or more actuators, a microcontroller that performs data processing, and/or another type of MTC device. Examples of such devices may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Access network 220 may provide access to provider network 240 for wireless devices, such as UE device 210. Access network 220 may provide mobile telephone service and/or data services to UE device 210. For example, access network 220 may establish a packet data network connection (e.g., an Internet Protocol (IP) connection) between UE device 210 and provider network 240. In some implementations, access network 220 may include a Long Term Evolution (LTE) access network (e.g., an evolved packet core (EPC) network) based on the LTE standard specified by the $3^{rd}$ Generation Partnership Project (3GPP). In other implementations, access network 220 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

Access network 220 may include a base station 230 and UE device 210 may wirelessly communicate with access network 220 via base station 230. For example, access network 220-A may include base station 230-A and access network 220-B may include base station 230-B. In other words, UE device 210 may be located within the geographic area serviced by base station 230. Base station 230 may be part of an LTE eNodeB base station device. An eNodeB base station device may use the Evolved Universal Terrestrial Radio Access (E-UTRA) air interface to wirelessly communicate with devices. An eNodeB base station device may include one or more devices (e.g., base stations 230) and other components and functionality that allow UE device 210 to wirelessly connect to access network 220. The eNodeB base station device may include or be associated with one or more cells. For example, each cell may include an RF transceiver facing a particular direction.

Provider network 240 may be managed, at least in part, by a provider of communication services associated with one or both of access network 220-A and 220-B. Provider network 240 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Provider network 240 may allow the delivery of Internet Protocol (IP) services to UE device 210, and may interface with other external networks. In some implementations, provider network 240 may include an Internet Protocol Multimedia Subsystem (IMS) network (not shown in FIG. 2). An IMS network may include a network for delivering IP multimedia services as specified by 3GPP or other standards/protocols and may provide media flows between UE device 210 and external IP networks or external circuit-switched networks (not shown in FIG. 2). Provider network 240 may include one or more server devices and/or network devices, or other types of computation or communication devices to manage the functionality of provider network 240. For example, provider network 240 may include a self-optimizing network (SON) system 250, a network management system 260, and a service requirements system 270.

SON system 250 may include one or more devices, such as computer devices and/or server devices, which perform self-optimization functions for provider network 140. In particular, SON system 250 may dynamically adjust the maximum number of repeat requests transmissions in provider network 240 based on end-to-end latency and based on service requirements associated with particular service types.

Network management system 260 may include one or more devices, such as computer devices and/or server devices, which monitor, collect, manage, and/or maintain network management information for provider network 240. In particular, network management system 260 may monitor and collect latency information for provider network 240. For example, network management system 260 may maintain historical and/or current latency data for particular links and/or devices in provider network 240. Additionally or alternatively, network management system 260 may obtain latency information for a particular communication session, and/or for a particular type of communication session, from communication session packet traces. Network management system 260 may provide the latency information to SON system 250.

Service requirements system 270 may include one or more devices, such as computer devices and/or server devices, which maintain and/or manage service requirements information for provider network 240. For example, service requirements system 270 may store service requirements information, including latency requirements, for particular service types (e.g., Quality of Service (QoS) class, sessions associated with a particular application, sessions associated with a particular communication protocol, etc.). Service requirements system 270 may provide the service requirements information to SON system 250.

Although FIG. 2 shows exemplary components of environment 200, in other implementations, environment 200 may include fewer components, different components, differently arranged components, or additional functional components than depicted in FIG. 2. Additionally or alternatively, one or more components of environment 200 may perform functions described as being performed by one or more other components of environment 200.

Figure 3:
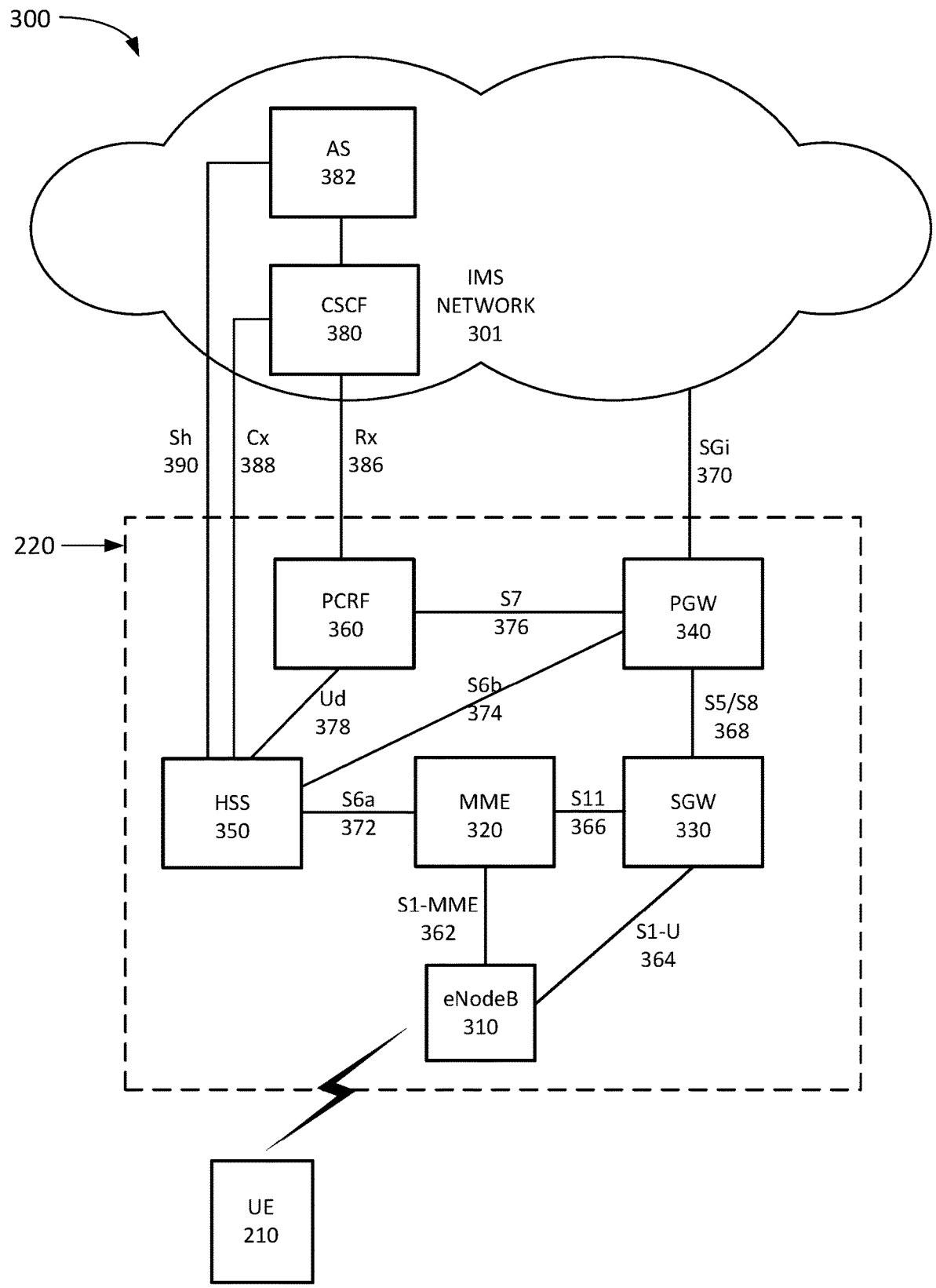
FIG. 3 is a diagram illustrating exemplary components of the access network of FIG. 2 and exemplary components of an Internet Protocol Multimedia Subsystem network that may be included in the provider network of FIG. 2.

FIG. 3 is a diagram illustrating exemplary components of a system 300 that includes access network 220 and an IMS network 301 according to an implementation described herein. IMS network 301 may be included in provider network 240 and may include a network for delivering IP multimedia services as specified by 3GPP or other standards/protocols and may provide media flows between UE device 210 and external IP networks or external circuit-switched networks. In some implementations, UE device 210 may establish a communication session with IMS network 301 and SON system 250 may adjust a HARQ number for the communication session based on the latency of the communication session and the latency requirements associated with the communication session.

As shown in FIG. 3, system 300 may include UE device 210, access network 220, and IMS network 301. Access network 220 may correspond to a Long Term Evolution (LTE) access network. Access network 220 may include one or more devices that implement logical entities interconnected via standardized interfaces, and that provide wireless packet-switched services and wireless IP connectivity to user devices for both data and voice services. Access network 220 may include eNodeB 310 (corresponding to base station 230), a mobility management entity (MME) 320, a serving gateway (SGW) 330, a packet data network gateway (PGW) 340, a home subscriber server (HSS) 350, and a Policy and Charging Rules Function (PCRF) 360. IMS network 301 may include a Call Session Control Flow (CSCF) 380 and an application server (AS) 382. While FIG. 3 depicts a single eNodeB 310, MME 320, SGW 330, PGW 340, HSS 350, PCRF 360, CSCF 380, and AS 382 for illustration purposes, in practice, FIG. 3 may include multiple eNodeBs 310, MMEs 320, SGWs 330, PGWs 340, HSS 350, PCRFs 360, CSCFs 380, and/or AS 382.

eNodeB 310 may include one or more devices (e.g., base stations) and other components and functionality that allow UE device 210 to wirelessly connect to access network 220 (e.g., base station 230). eNodeB 310 may include or be associated with one or more cells. For example, each cell may include a radio frequency (RF) transceiver facing a particular direction. eNodeB 310 may interface with access network 220 via an interface referred to as an S1 interface, which may be split into a control plane S1-MME interface 362 and a data plane S1-U interface 364. S1-MME interface 362 may interface with MME 320. S1-MME interface 362 may be implemented, for example, with a protocol stack that includes a Network Access Server (NAS) protocol and/or Stream Control Transmission Protocol (SCTP). An S1-U interface 364 may interface with SGW 330 and may be implemented, for example, using GTPv2.

MME 320 may implement control plane processing for access network 220. For example, MME 320 may implement tracking and paging procedures for UE device 210, may activate and deactivate bearers for UE device 210, may authenticate a user of UE device 210, and may interface to non-LTE radio access networks. A bearer may represent a logical channel with particular quality of service (QoS) requirements. MME 320 may also select a particular SGW 330 for a particular UE device 210. A particular MME 320 may interface with other MMES 320 in access network 220 and may send and receive information associated with UE devices 210, which may allow one MME 320 to take over control plane processing of UE devices serviced by another MME 320, if the other MME 320 becomes unavailable.

SGW 330 may provide an access point to and from UE device 210, may handle forwarding of data packets for UE device 210, and may act as a local anchor point during handover procedures between eNodeBs 310. SGW 330 may interface with PGW 340 through an S5/S8 interface 368. S5/S8 interface 368 may be implemented, for example, using GTPv2.

PGW 340 may function as a gateway to provider network 240 and/or IMS network 301 through an SGi interface 370. A particular UE device 210, while connected to a single SGW 330, may be connected to multiple PGWs 340, one for each packet network with which UE device 210 communicates.

MME 320 may communicate with SGW 330 through an S11 interface 366. S11 interface 366 may be implemented, for example, using GTPv2. S11 interface 366 may be used to create and manage a new session for a particular UE device 210. S11 interface 366 may be activated when MME 320 needs to communicate with SGW 330, such as when the particular UE device 210 attaches to access network 220, when bearers need to be added or modified for an existing session for the particular UE device 210, when a connection to a new PGW 340 needs to be created, or during a handover procedure (e.g., when the particular UE device 210 needs to switch to a different SGW 330).

HSS 350 may store information associated with UE devices 210 and/or information associated with users of UE devices 210. For example, HSS 350 may store subscription profiles that include authentication and access authorization information. Each subscription profile may include a list of UE devices 210 associated with the subscription as well as an indication of which UE device 210 is active (e.g., authorized to connect to access network 220 and to IMS network 301 via access network 220).

MME 320 may communicate with HSS 350 through an S6a interface 372. S6a interface 372 may be implemented, for example, using a Diameter protocol. PGW 340 may communicate with HSS 350 through an S6b interface 374. S6b interface 374 may be implemented, for example, using a Diameter protocol.

PCRF 360 may implement policy charging and rule functions, such as establishing QoS requirements, bandwidth, and/or charges for a particular service for a UE device 210. PCRF 360 may communicate with PGW 340 through an S7 interface 376 and may communicate with HSS 350 through a Ud interface 378. S7 interface 376 may be based on a legacy Gx interface and may be implemented, for example, using Diameter protocol. Ud interface 378 may be used to exchange subscription data between PCRF 360 and HSS 350 and may be based on a provider specified protocol.

IMS network 301 may be associated with an IMS core identity for a particular subscription for UE device 210. HSS 350 may receive information identifying the IMS core identity for a subscription and may provide the IMS core identity to a particular UE device 210 that is connected to access network 220. CSCF 380 may handle signaling, controlling of media paths, and activation of applications in IMS network 301. AS 382 may implement particular services and interact with CSCF 380 to deliver the particular services to UE device 210. CSCF 380 may communicate with PCRF 360 through an Rx interface 386 and may communicate with HSS 350 through a Cx interface 388. Rx interface 386 and Cx interface 388 may be implemented, for example, using Diameter protocol. AS 382 may communicate with HSS 350 through an Sh interface 390. Sh interface 390 may be implemented, for example, using Diameter protocol.

Although FIG. 3 shows exemplary components of access network 220 and IMS network 301, in other implementations, access network 220 and/or IMS network 301 may include fewer components, different components, differently arranged components, or additional components than depicted in FIG. 3. Additionally or alternatively, one or more components of access network 220 and/or IMS network 301 may perform functions described as being performed by one or more other components of access network 220 and/or IMS network 301.

Figure 4:
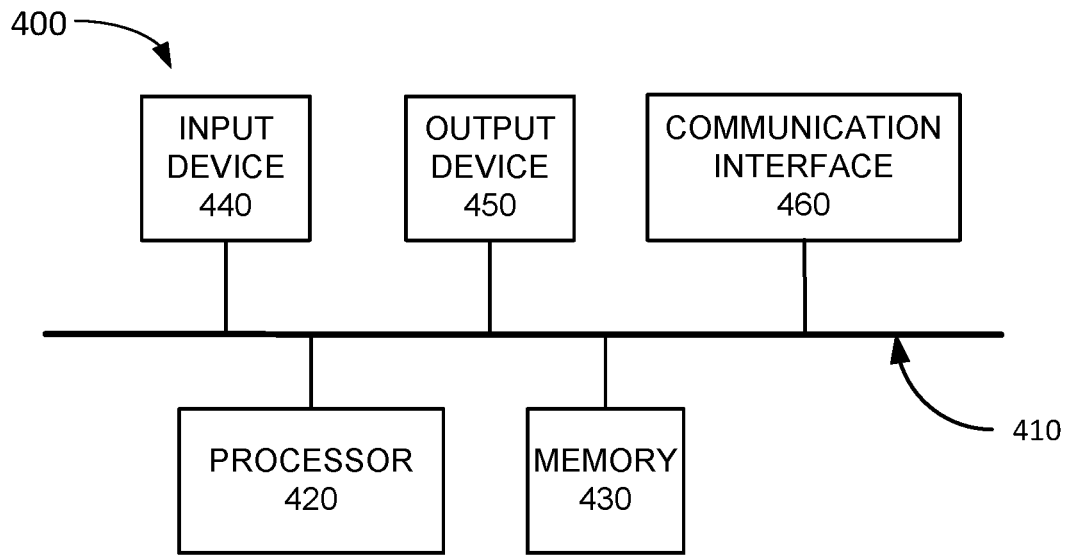
FIG. 4 is a diagram illustrating exemplary components of a device that may be included in a device of FIG. 2 or a device of FIG. 3.

FIG. 4 is a diagram illustrating exemplary components of device 400 according to an implementation described herein. SON system 250, network management system 260, service requirements system 270, MME 320, SGW 330, PGW 340, HSS 350. PCRF 360, CSCF 380, AS 382, eNodeB 310, and/or UE device 210 may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to RF signals and/or a receiver that converts RF signals to baseband signals. Communication interface 460 may be coupled to an antenna for transmitting and receiving RF signals. If device 400 is included in UE device 210 or eNodeB 310, communication interface 460 may include an antenna assembly.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to dynamic adjustment of the maximum allowed number of repeat requests transmissions. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally or alternatively, one or more components of device 400 may perform one or more tasks described as being performed by one or more other components of device 400.

Figure 5:
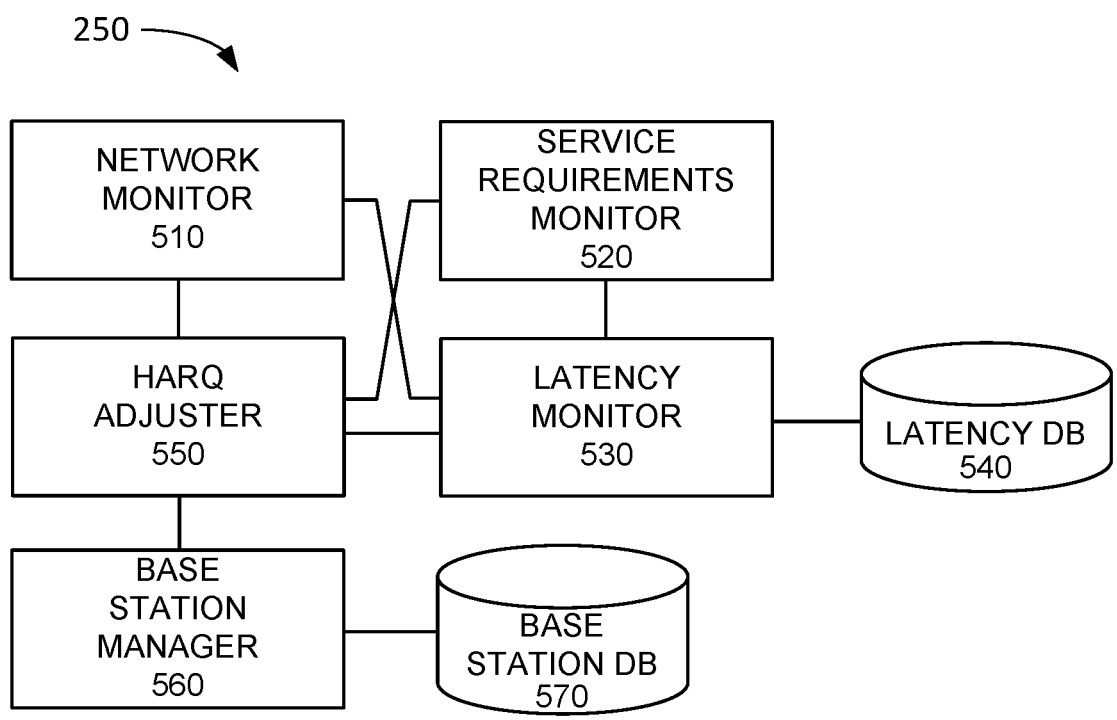
FIG. 5 is a diagram illustrating exemplary functional components of the self-optimizing network system of FIG. 2.

FIG. 5 is a diagram illustrating exemplary functional components of SON system 250. The functional components of SON system 250 may be implemented, for example, via processor 420 executing instructions from memory 430. Alternatively, some or all of the functional components included in system 400 may be implemented via hard-wired circuitry. As shown in FIG. 5, SON system 250 may include a network monitor 510, a service requirements monitor 520, a latency monitor 530, a latency database (DB) 540, a HARQ adjuster 550, a base station manager 560, and a base station DB 570.

Network monitor 510 may monitor provider network 240 and/or access networks 220 to identify communication sessions, and/or particular types of communication sessions in order to determine whether to adjust a HARQ number for particular communication sessions, and/or particular types of communication sessions. As an example, network monitor 510 may instruct AS 382 and/or CSCF 380 to inform network monitor 510 when a new IMS session is generated. As another example, PGW 340 may be configured to inform network monitor 510 that a new IP address has been assigned to UE device 210. As yet another example, a routing or switching device in provider network 240, and/or network management system 260, may inform network monitor 510 that a new path or circuit has been generated in provider network 240. As yet another example, network monitor 510 may detect a new subscription associated with a set of UE devices 210 and may select communication sessions associated with the subscription.

Service requirements monitor 520 may monitor service requirements for particular service types. For example, service requirements monitor 520 may obtain the service requirements, including latency requirements, for a particular service type from service requirements system 270 and may provide the obtained latency requirements to HARQ adjuster 550.

Latency monitor 530 may monitor provider network 240 and/or access networks 220 for latency conditions. In some implementations, latency monitor 530 may obtain latency information from network management system 260 and may store the latency information in latency DB 540. Latency DB 540 may store latency information associated with environment 100. Exemplary information that may be stored in latency DB 540 is described below with reference to FIG. 6. In other implementations, latency monitor 530 may obtain some or all of the latency information from other sources. For example, in some implementations, latency monitor 530 may obtain historical latency information for links, paths, and/or devices of provider network 240 and/or access networks 220 from network management system 260 and may obtain packet traces for particular communication sessions from a packet trace application running on UE devices 210, base stations 230, and/or network devices, such as AS 382.

HARQ adjuster 550 may compute a HARQ adjustment (and/or a different type of repeat requests adjustment) for a particular communication session or a type of communication session. For example, HARQ adjuster 550 may determine an end-to-end latency for the communication session, or type of communication session, may determine a latency requirement for a service type associated with the communication session, or type of communication session, and may compute the HARQ adjustment based on the determined end-to-end latency and the determined latency requirements.

Base station manager 560 may instruct a base station 230 to adjust a HARQ number based on a HARQ adjustment computed by HARQ adjuster 550 using information stored in base station DB 570. Base station DB 570 may store information identifying particular base stations 230 associated with access networks 220. For example, base station DB 570 may identify eNodeBs 310 with which SON system 250 is configured to communicate and may store information on how to reach the eNodeBs 310 and/or how to instruct the eNodeBs 310 to adjust a HARQ number for a particular communication session or a set of communication sessions. Furthermore, base station DB 570 may store information relating to current HARQ numbers associated with a particular eNodeB 310. Base station DB 570 may improve efficiency and/or performance of access network 220 and/or provider network 240 by enabling SON system 250 to quickly identify eNodeBs 310 for which a HARQ adjustment was selected to be performed.

Although FIG. 5 shows exemplary components of SON system 250, in other implementations, SON system 250 may include fewer components, different components, additional components, or differently arranged components than depicted in FIG. 5. Additionally or alternatively, one or more components of SON system 250 may perform one or more tasks described as being performed by one or more other components of SON system 250. Furthermore, in some implementations, some or all of the functional components of SON system 250 shown in FIG. 5 may be implemented in one or more devices of system 300, such as, for example, AS 382 and/or MME 320, or in another device of environment 200, such as network management system 260. As an example, in other implementations, HARQ adjuster 550 may be implemented in eNodeB 310. As another example, in other implementations, HARQ adjuster 550 may be implemented in another device separate from the devices shown in FIG. 3, such as a node connected to eNodeB 310 and/or MME 320. As yet another example, HARQ adjuster 550 may be implemented in AS 382 of IMS network 301.

Figure 6:
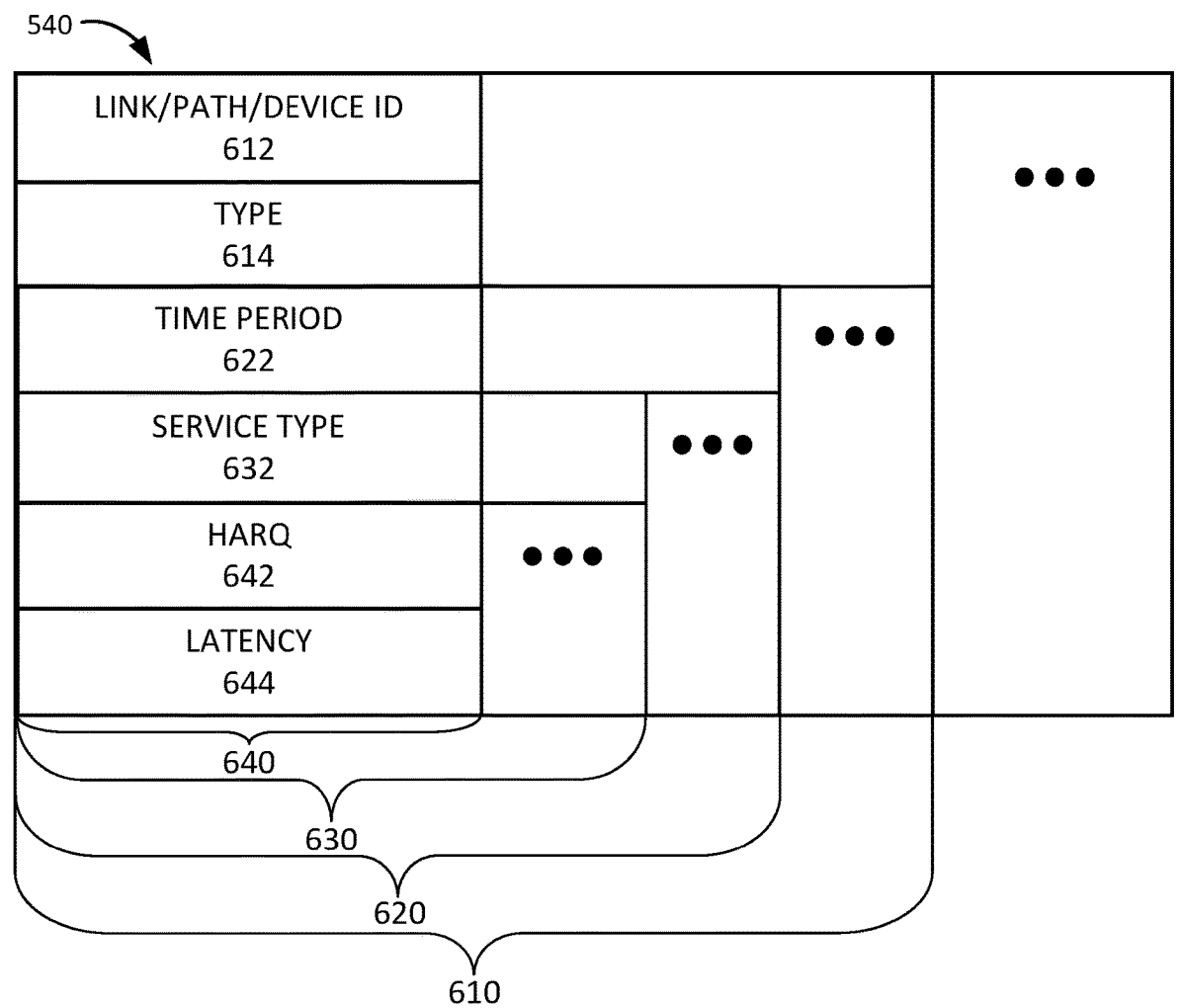
FIG. 6 is a diagram illustrating exemplary components of the latency database of FIG. 5.

FIG. 6 is a diagram illustrating exemplary components of latency DB 540. As shown in FIG. 6, latency DB 540 may include one or more link/path/device records 610. A link/path/device record 610 may store latency information for a particular link, a particular path (e.g., a set of links, a path through a network, etc.), or a particular device in provider network 240 and/or access network 220. Link/path/record 610 may include a link/path/device record 610 may include a link/path/device identifier (ID) field 612, a type field 614, and one or more time period records 622.

Link/path/device ID field 612 may store a unique identifier and/or information identifying a particular link, a particular path, or a particular device and type field 614 may store information identifying a type of record for link/path/device record 610 (e.g., a link type, a path type, a device type, etc.). For example, link/path/device ID field 612 may identify an interface, or a pair of interfaces for a link, may identify a set of links for a path, and/or may identify a network address (e.g., IP address, a media access control (MAC) address, a Session Initiation Protocol (SIP) address, etc.) for a network device, such as a router, switch, gateway, firewall, application server, and/or another type of network device.

Time period record 620 may store latency information for a particular time period. As an example, time period record 620 may store latency information for a repeating time period, such as a particular time of day, a particular day of the week, etc. As another example, time period record 620 may store latency information for a specific time period that occurred in the past, such as for particular time and day, for the past 24 hours, for the past hour, etc. As yet another example, a particular time period record 620 may store the most recently available latency information. Time period record 620 may include a time period field 622 and one or more service type records 630. Time period field 622 may store information identifying the particular time period.

Each service type record 630 may store latency information for a particular service type. Service type record 630 may include a service type field 632 and one or more HARQ records 640. Service type field 632 may identify the particular service type. For example, service type field 632 may identify a particular QoS class (e.g., a voice communication QoS class, a real-time video QoS class, a streaming video QoS class, a real-time gaming QoS class, a high priority data traffic QoS class, a best effort QoS class, etc.); a particular application type (e.g., a video streaming application, an audio streaming application, a voice communication application, a navigation application, a text messaging application, a gaming application etc.); a particular communication protocol (e.g., SIP, Web Real-Time Communication (WebRTC), Real-time Transport Protocol (RTC), etc.); and/or may identify a different type of service type. For example, with respect to communication protocols, different HARQ numbers may be set for a data plane communication protocol and a control plane communication protocol.

HARQ record 640 may store latency information associated with a particular HARQ value for the particular service type. HARQ record 640 may include a HARQ field 642 and a latency field 644. HARQ field 642 may store the particular HARQ value and latency field 644 may store the particular latency value associated with the particular HARQ value for the particular service type for the particular time period for the particular link/path/device.

Although FIG. 6 shows exemplary components of latency DB 540, in other implementations, latency DB 540 may include fewer components, different components, additional components, or differently arranged components than depicted in FIG. 6.

Figure 7:
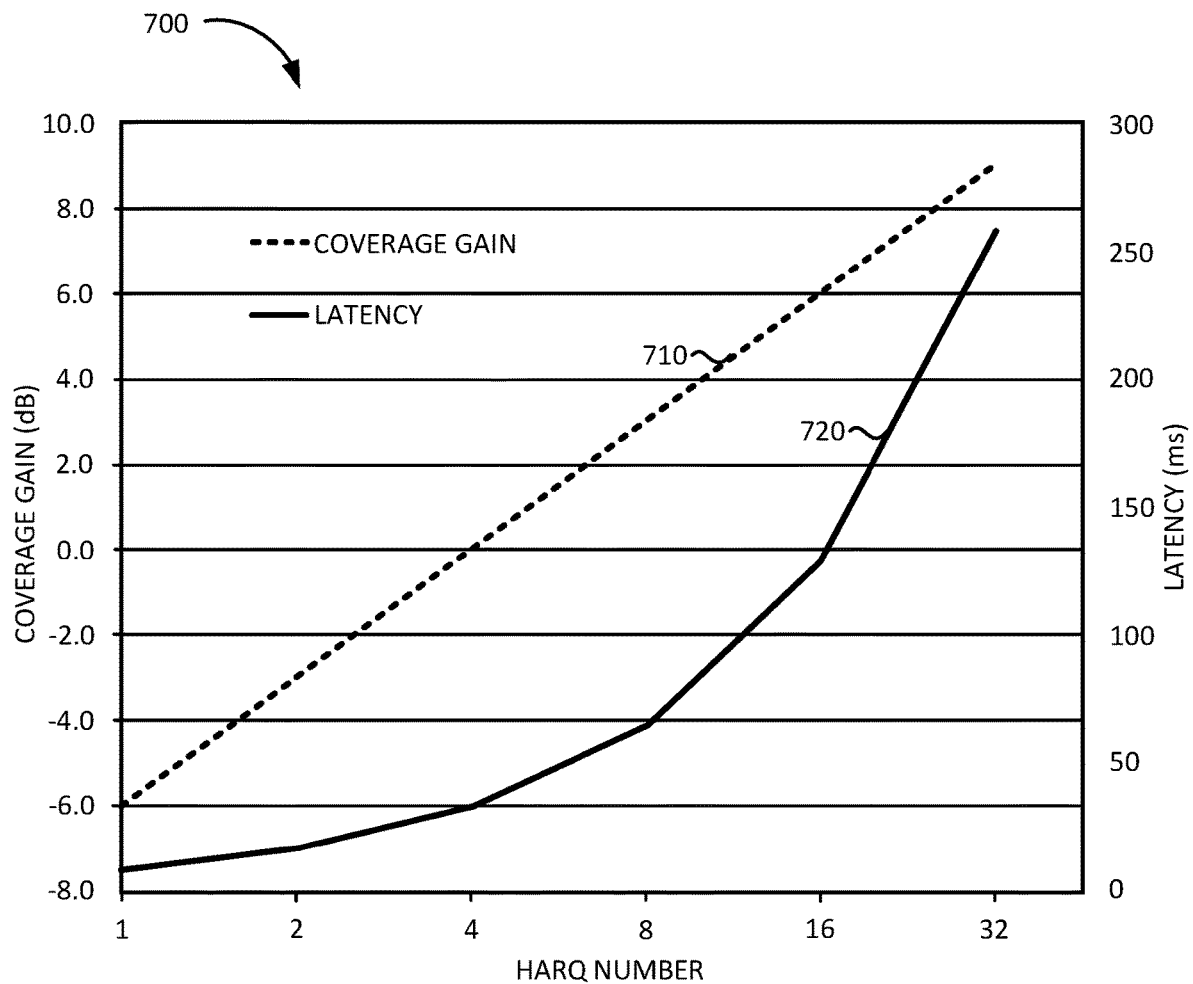
FIG. 7 is a diagram illustrating exemplary latency and coverage gain curves according to an implementation described herein.

FIG. 7 illustrates a graph 700 showing exemplary latency and coverage gain curves according to an implementation described herein. Graph 700 includes a coverage gain curve 710 and a latency curve 720. Coverage gain curve 710 illustrates the relationship between HARQ number and coverage gain in decibels (dB). The higher the HARQ number, the more retransmissions UE device 210 is allowed to make, giving UE device 210 a higher probability of a successful transmission of data to base station 230 at more distant locations. Thus, a higher HARQ number may result in an increase in the coverage. However, increasing the HARQ number may result in higher latency, as a higher number of retransmissions may take a longer amount of time.

As shown in graph 700, latency curve 720 may not be linear. Latency curve 720 may be determined empirically by measuring the observed latency for a particular communication session type as the HARQ number is increased. Latency curve 720 may be used to determine or estimate a resulting latency if a HARQ number is increased for a communication session of a particular type. Thus, latency curve 720 may be used to compute the empirical expected latency for a particular HARQ number. Different latency curves 720 for different communication session types may be stored and/or maintained by SON system 250 and used by HARQ adjuster 550 when computing a HARQ adjustment.

Figure 8:
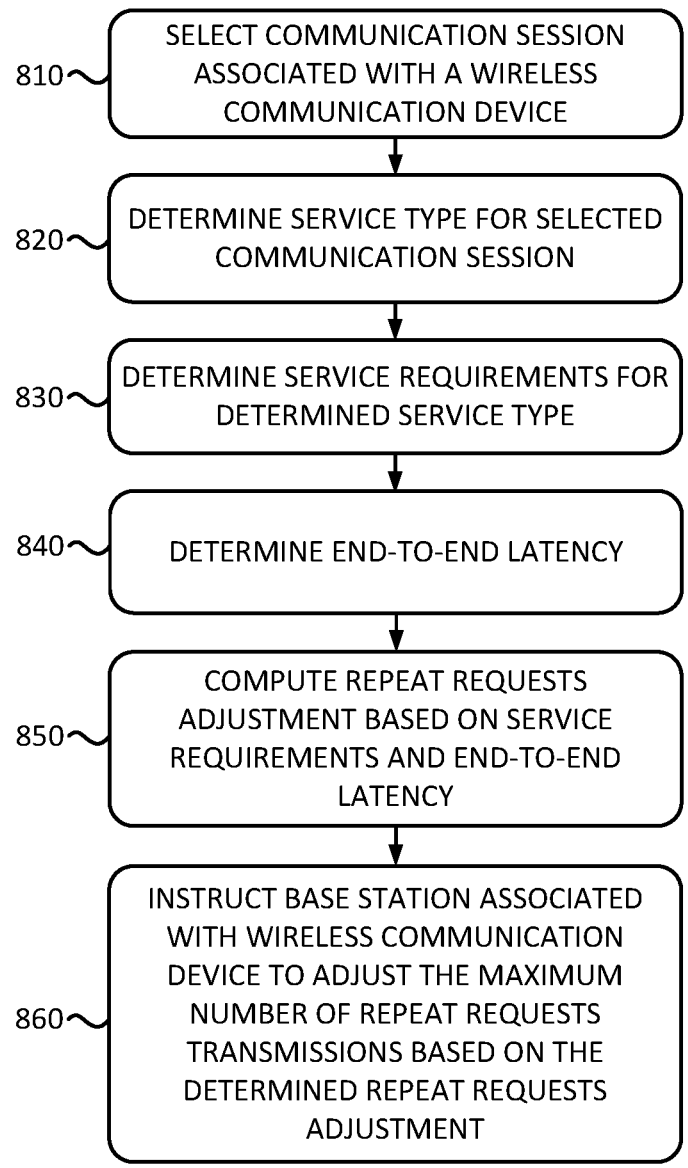
FIG. 8 is a flowchart of a process for dynamically adjusting repeat requests according to an implementation described herein.

FIG. 8 is a flowchart of a process for dynamically adjusting repeat requests according to an implementation described herein. In some implementations, the process of FIG. 8 may be performed by SON system 250. In other implementations, some or all of the process of FIG. 8 may be performed by another device or a group of devices separate from SON system 250.

The process of FIG. 8 may include selecting a communication session associated with a wireless communication device (block 810). As an example, network monitor 510 may detect a communication session based on receiving an indication from a device (e.g., AS 382, MME 320, PGW 340, etc.) that a communication session has been established. As another example, network monitor 510 may maintain a queue of communication sessions for processing and may select a communication session from the queue. As yet another example, network monitor 510 may receive a request from a device (e.g., from eNodeB 310) to adjust a HARQ number for a communication session or a type of communication session.

A service type for the selected communication session may be determined (block 820) and service requirements for the determined service type may be determined (block 830). For example, network monitor 510 may determine a service type for the selected communication session (e.g., a particular QoS class, a particular application type, a particular communication protocol, etc.) and service requirements monitor 520 may obtain the service requirements for the determined service type from service requirements system 270. The obtained service requirements may include the latency requirements for the determined service type, such as the maximum allowed latency for the determined service type. Furthermore, the obtained service requirements may include other types of requirements, such as a packet delay requirement. The packet delay requirement may specify a maximum allowable packet delay for the determined service type.

End-to-end latency may be determined (block 840). For example, latency monitor 530 may determine the end-to-end latency for the selected communication session based on information stored in latency DB 540 and/or based on information received from network management system 260 and/or other devices. As an example, latency monitor 530 may compute the end-to-end latency for the communication session by determining a path for the communication session and by adding up latency values associated with components of the path, including links and devices that are part of the determined path, which are stored in latency DB 540. As another example, latency monitor 530 may receive packet trace information based on a packet trace performed by an application running on UE device 210, or another device (e.g., eNodeB 310) associated with the selected communication session.

A repeat requests adjustment may be computed based on the determined service requirements and based on the determined end-to-end latency (block 850). For example, HARQ adjuster 550 may compute a HARQ adjustment for the selected communication session based on the determined service requirements and based on the determined end-to-end latency. Exemplary methods of computing the HARQ adjustment are described below with reference to FIGS. 9, 10, and 11.

A base station associated with the wireless communication device may be instructed to adjust the maximum number of repeat requests transmissions based on the determined repeat requests adjustment (block 860). For example, base station manager 560 may instruct a base station 230 associated with the selected communication session to adjust the maximum allowed number of HARQ transmissions based on the computed HARQ adjustment.

Figure 9:
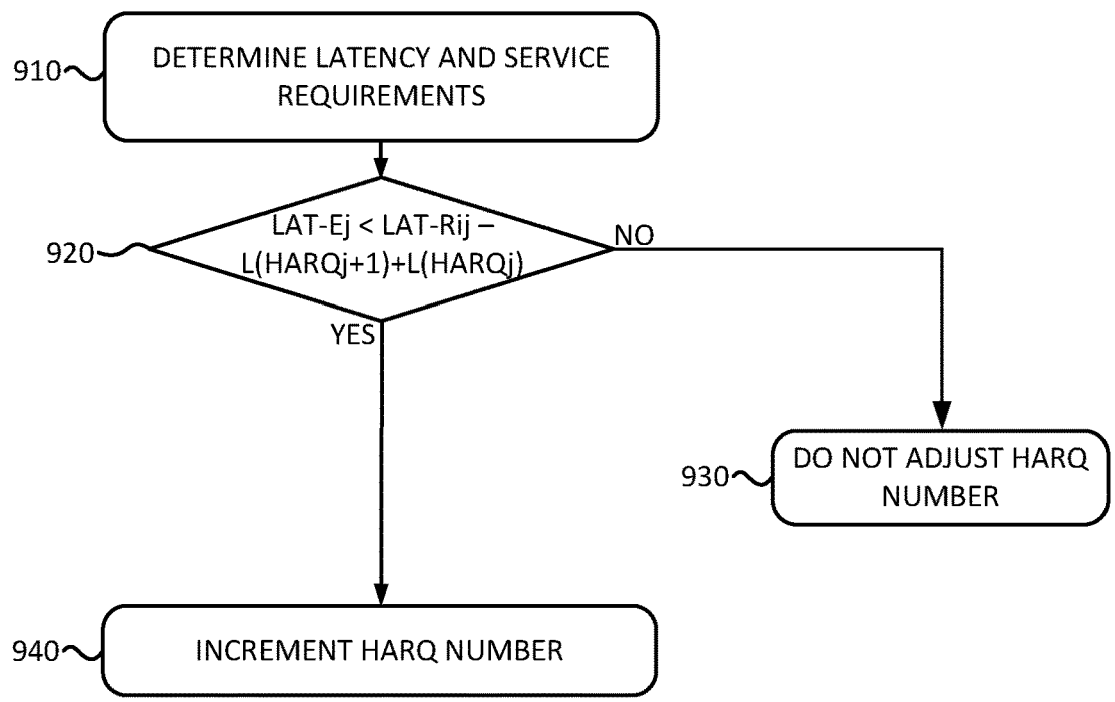
FIG. 9 is a flowchart of a process for increasing a repeat request number according to an implementation described herein.

In determining the HARQ adjustments, SON system 250 may perform one or more processes to determine whether to increase or decrease the HARQ number. For example, SON system 250 may ensure that increasing the HARQ number would not increase the latency above the service requirement. FIG. 9 is a flowchart of a process for increasing a repeat request number according to an implementation described herein. In some implementations, the process of FIG. 9 may be performed by SON system 250. In other implementations, some or all of the process of FIG. 9 may be performed by another device or a group of devices separate from SON system 250.

The process of FIG. 9 may include determining the latency and the service requirements (block 910), as described above with respect to blocks 810, 820, 830, and 840 of FIG. 8. A determination may be made as to whether increasing the HARQ number would result in an end-to-end latency that is higher than a latency value specified by the service requirements (block 920). The latency value at the current HARQ number, referred to herein as L(HARQ), and the resulting latency value if the HARQ number is incremented, referred to herein as L(HARQ+1), may be determined based on latency curve 720. The current HARQ number may be obtained, for example, from base station DB 570. Assume the determined end-to-end latency (Lat-$E_j$) corresponds to L(HARQ). In order to determine whether increasing the HARQ number would result in a latency that is higher than the latency requirement (Lat-$R_{ij}$), the following comparison may be made:

$$\text{Lat-}E_j < \text{Lat-}R_{ij} - L(\text{HARQ}_j+1) + L(\text{HARQ}_j) \qquad \text{Exp. (1)}$$

In Expression (1), the index j may refer to a particular HARQ process. For example, eNodeB 310 may utilize multiple HARQ process queues in parallel (e.g., 8 HARQ processes) while waiting for retransmissions for higher efficiency. Thus, $\text{HARQ}_0$ may refer to the first HARQ process queue in eNodeB 310, $\text{HARQ}_1$ may refer to the second HARQ process queue in eNodeB 310, etc. The index i may refer to a particular service type (e.g., particular QoS class, particular application type, particular communication protocol, etc.). If Expression (1) is not satisfied (block 920—NO), the HARQ number may not be adjusted (block 930). If Expression (1) is satisfied (block 920—YES), the HARQ number may be incremented (block 940).

Figure 10:
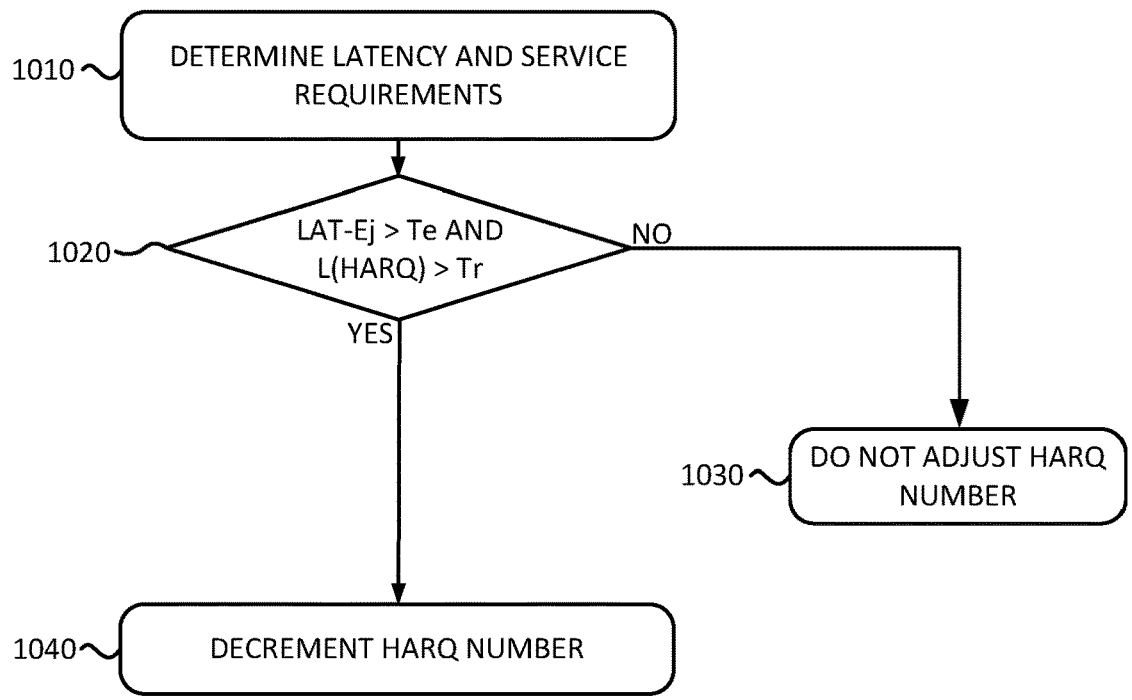
FIG. 10 is a flowchart of a process for decreasing a repeat request number according to an implementation described herein.

Additionally or alternatively, SON system 250 may select to decrease the HARQ number if the latency is too high. FIG. 10 is a flowchart of a process for decreasing a repeat request number according to an implementation described herein. In some implementations, the process of FIG. 10 may be performed by SON system 250. In other implementations, some or all of the process of FIG. 10 may be performed by another device or a group of devices separate from SON system 250.

The process of FIG. 10 may include determining the latency and the service requirements (block 1010), as described above with respect to blocks 810, 820, 830, and 840 of FIG. 8. A determination may be made as to whether the determined end-to-end latency is greater than a first threshold $T_e$ and whether the latency value at the current HARQ number, L(HARQ), is greater than a second threshold $T_r$ (block 1020). The thresholds $T_e$ and $T_r$ may be configurable and $T_e$ may be set higher than the latency requirement Lat-$R_{ij}$. Thus, thresholds $T_e$ and $T_r$ may be used to ensure that the latency does not rise above a configurable threshold by making the following comparison:

$$\text{Lat-}E_j > T_e \text{ AND } L(\text{HARQ}_j) > T_r \qquad \text{Exp. (2)}$$

If Expression (2) is not satisfied (block 1020—NO), the HARQ number may not be adjusted (block 1030). If Expression (2) is satisfied (block 1020—YES), the HARQ number may be decremented (block 1040).

Figure 11:
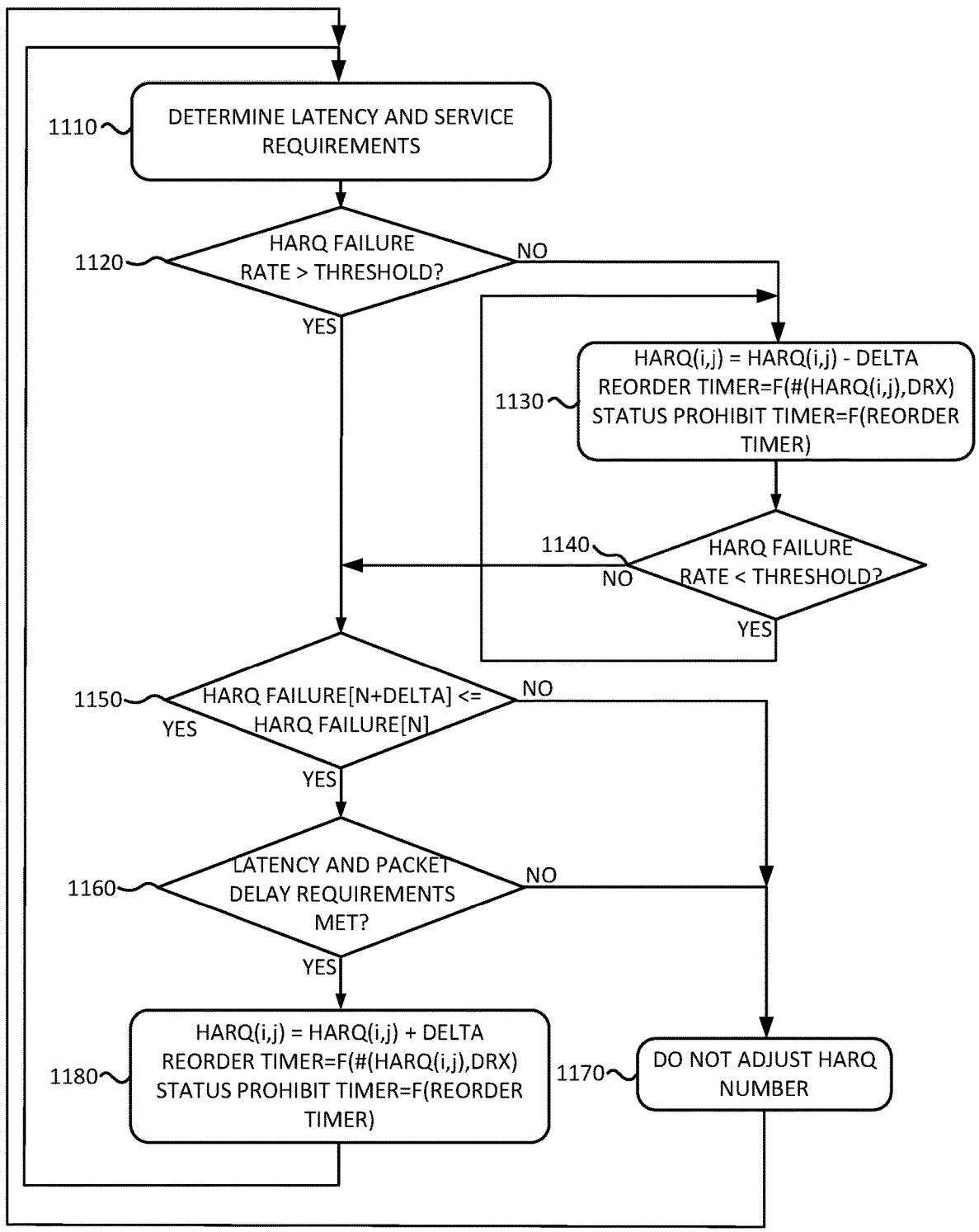
FIG. 11 is a flowchart of a process for applying bounds to adjusting repeat requests according to an implementation described herein.

In some implementations, SON system 250 may select not to adjust the HARQ number if the RF signal quality is above a quality threshold (e.g., the RF conditions are good). Furthermore, SON system 250 may select to stop increasing the HARQ number if there is no improvement in performance with more transmissions (e.g., the RF conditions are poor). FIG. 11 is a flowchart of a process for applying bounds to adjusting repeat requests according to an implementation described herein. In some implementations, the process of FIG. 11 may be performed by SON system 250. In other implementations, some or all of the process of FIG. 11 may be performed by another device or a group of devices separate from SON system 250.

The process of FIG. 11 may include determining the latency and the service requirements (block 1110), as described above with respect to blocks 810, 820, 830, and 840 of FIG. 8. A determination may be made as to whether the HARQ failure rate is greater than a threshold (block 1120). For example, HARQ adjuster 550 may obtain HARQ failure rate date from eNodeB 310 via base station manager 560 and may compare the HARQ failure rate to a HARQ failure rate threshold. The HARQ failure rate may be calculated dynamically based on, for example, a Block Error Rate (BLER), a frame error rate, UE device 210 pathloss, and/or the codec being used.

If it is determined that the HARQ failure rate is not above the HARQ failure rate threshold (block 1120—NO), the HARQ number may be reduced to save resources (block 1130). Since the HARQ performance is good, as determined based on the HARQ failure rate, the HARQ number may be reduced to save resources. In some implementations, the HARQ number may be reduced for eNodeBs 310 that are experiencing a load (e.g., based on a number of UE devices 210 being serviced by a particular eNodeB 310) higher than a threshold load.

Additionally, a packet sequence reorder timer and a status prohibit timer may be adjusted (block 1130). A packet sequence reorder timer may control the length of time during which out-of-sequence packets are accepted. The status prohibit timer may control the length of time during which another status report may not be sent after a status report has already been sent, and may be a function of the HARQ number and whether discontinuous mode (DRX) is enabled. In DRX mode, UE device 210 may receive data discontinuously in order to preserve battery life and may be in a sleep state, resulting in a time delay when communication is initiated. The status prohibit timer may be a function of the packet sequence reorder timer and/or may be set to the same value as the packet sequence reorder timer. The packet sequence reorder timer and the status prohibit timer may need to be adjusted if the HARQ number is changed, as a lower HARQ number may result in a shorter period of time during which packets may be retransmitted from the transmitter to the receiver. Thus, SON system 250 may instruct eNodeB 310 to adjust a packet sequence reorder timer based on the adjusted HARQ number and DRX profiles of service types, if applicable, and to adjust a status prohibit timer based on the adjusted packet sequence reorder timer. Furthermore, in some implementations, SON system 250 may instruct a first UE device 210, associated with a communication session, to adjust a DRX profile. Adjusting a DRX profile at a first UE device 210 may enable a higher number of adjustable transmission repetitions at a second UE device 210 associated with the communication session.

After adjustments, processing may continue to determine whether the HARQ failure rate is less than the threshold (block 1140), in order to determine whether the adjustments resulted in an improvement in performance. If the HARQ failure rate is less than the threshold (block 1140—YES), processing may return to block 1130 to perform another adjustment. Thus, the HARQ may continue to be adjusted if performance continues to improve. If the HARQ failure rate is not less than the threshold (block 1140—NO), no further improvements are available and processing may proceed to block 1150 to determine whether the change in the HARQ resulted in a change in the HARQ failure rate, as described below with reference to block 1150.

Returning to block 1120, if it is determined that the HARQ failure rate is above the HARQ failure rate threshold (block 1120—YES), a determination may be made as to whether the HARQ failure rate for an adjusted HARQ, HARQ FAILURE [N+delta], is less than or equal to the HARQ failure rate for the current HARQ, HARQ FAILURE [N] (block 1150). If it is determined that the HARQ failure rate for the adjusted HARQ is greater than the HARQ failure rate for the current HARQ (block 1150—NO), the HARQ number may not be adjusted (block 1170). Thus, block 1150 may prevent the HARQ number from being increased if there is no performance improvement with an increasing number of retransmissions.

Returning to block 1150, if it is determined that the HARQ failure rate for the adjusted HARQ is less than or equal to the HARQ failure rate for the current HARQ (block 1150—YES), a determination may be made as to whether the latency and packet delay requirements are met (block 1160). If the latency and packet delay requirements are not met with the adjusted HARQ (block 1160—NO), the HARQ number may not be adjusted (block 1170). Thus, block 1160 may prevent the HARQ number from being increased if increasing the HARQ number would violate the latency or packet delay requirements. If the latency and packet delay requirements are met with the adjusted HARQ (block 1160—YES), the HARQ number may be increased (block 1180). Since the HARQ failure rate improves (i.e., is lower) with an increase in the HARQ number, the HARQ number may be increased without necessarily increasing latency.

Additionally, the packet sequence reorder timer, and status prohibit timer may be adjusted (block 1180). The packet sequence reorder timer and the status prohibit timer may need to be adjusted if the HARQ number is changed, as a higher HARQ number may result in a longer period of time during which packets may be retransmitted from the transmitter to the receiver. Processing may return to block 1110 to obtain an updated latency value.

Figure 12:
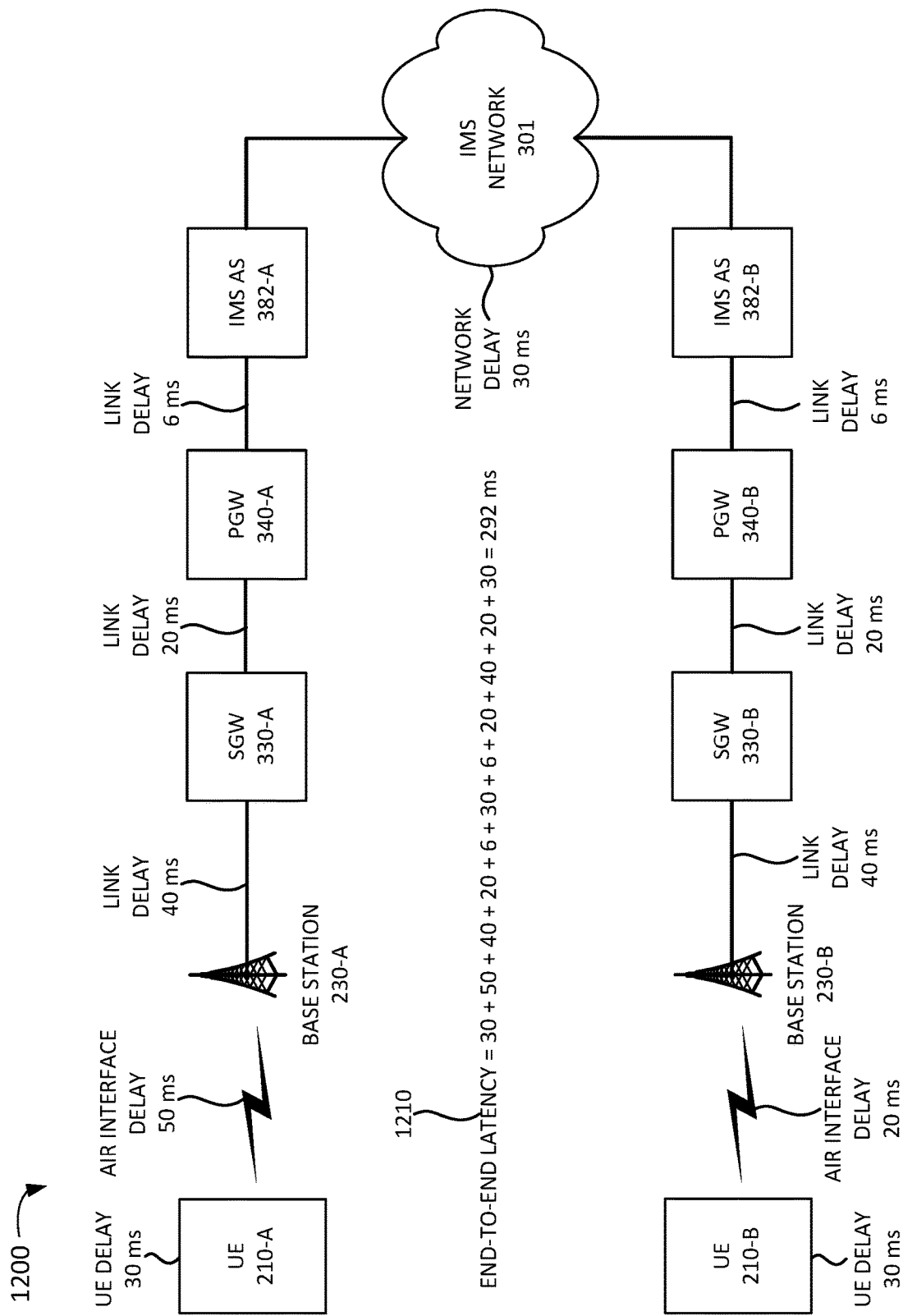
FIG. 12 is a diagram of an exemplary end-to-end latency scenario according to an implementation described herein.

FIG. 12 is a diagram of an exemplary end-to-end latency scenario 1200 according to an implementation described herein. As shown in FIG. 12, an end-to-end latency 1210 may be computed based on a sum of latencies determined for links and devices that are traversed by a communication signal from UE device 210-A to UE device 210-B. End-to-end latency 1210 may include a first UE device 210 delay of 30 ms, a first air interface delay of 50 ms, a first link delay of 40 ms between base station 230-A and SGW 330-A, a second link delay of 20 ms between SGW 330-A and PGW 340-A, a third link delay of 6 ms between PGW 340-A and IMS AS 382-A, a network delay of 30 ms through IMS network 301, a fourth link delay of 6 ms between IMS AS 382-B and PGW 340-B, a fifth link delay of 20 ms between PGW 340-B and SGW 330-B, a sixth link delay of 40 ms between SGW 330-B and base station 230-B, a second air interface delay of 20 ms between base station 230-B and UE device 210-B, and a second UE device 210 delay of 30 ms, for a total end-to-end latency of 292 ms. End-to-end latency 1210 may be used to determine whether to adjust the HARQ number for a communication session between UE device 210-A and UE device 210-B.

Figure 13:
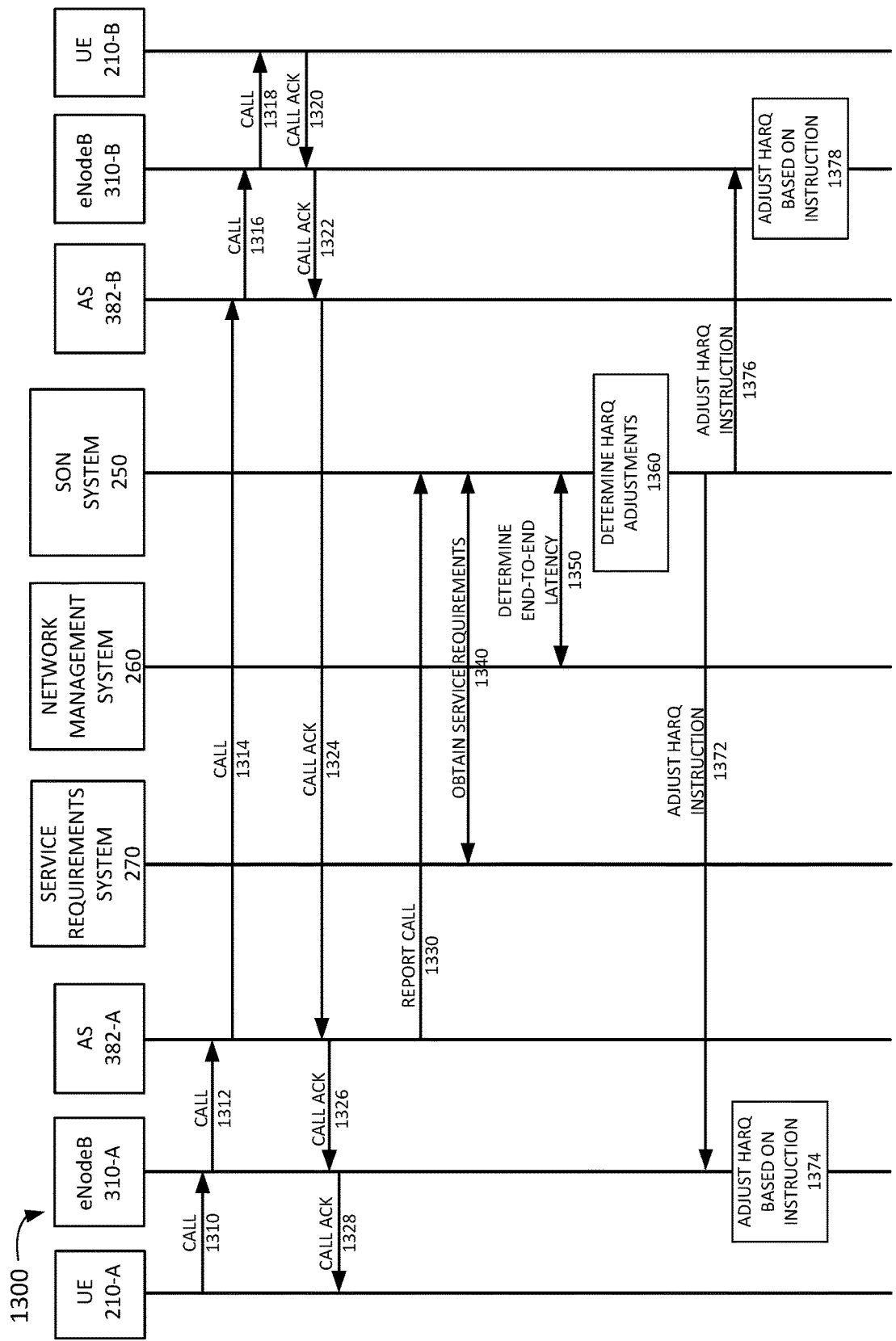
FIG. 13 is a diagram of an exemplary signal flow according to an implementation described herein.

FIG. 13 is a diagram of an exemplary signal flow 1300 according to an implementation described herein for a call associated with end-to-end latency scenario 1200 of FIG. 12. As shown in FIG. 13, signal flow 1300 may include UE device 210-A initiating a call to UE device 210-B. A SIP request may be sent by UE device 210-A to eNodeB 310-A (signal 1310), forwarded by eNodeB 310-A to AS 382-A (signal 1312), forwarded by AS 382-A to AS 382-B (signal 1314), forwarded by AS 382-B to eNodeB 310-B (signal 1316), and forwarded by eNodeB 310-B to UE device 210-B (signal 1318). UE device 210-B may accept the call by responding with an acknowledgement (ACK) signal sent by UE device 210-B to eNodeB 310-B (signal 1320), forwarded by eNodeB 310-B to AS 382-B (signal 1322), forwarded by AS 382-B to AS 382-A (signal 1324), forwarded by AS 382-A to eNodeB 310-A (signal 1326), and forwarded by eNodeB 310-A to UE device 210-A (signal 1328). The communication session may now be established.

AS 382-A may report the call to SON system 250 (signal 1330). SON system 250 may obtain the service requirements for the call from service requirements system 270 and service requirements system 270 may provide the latency requirements for the call, such as the highest acceptable latency, to SON system 250 (signal 1340). Furthermore, SON system 250 may determine the end-to-end latency for the call from network management system 260 and network management system 260 may determine the end-to-end latency as shown above with respect to FIG. 12 (signal 1350). SON system 250 may compute the HARQ adjustments for eNodeB 310-A and eNodeB 310-B based on the obtained service requirements and the determined end-to-end latency (block 1360).

SON system 250 may then send an instruction to eNodeB 310-A to adjust the maximum number of HARQ transmission (signal 1372) and eNodeB 310-A may adjust the HARQ number based on the received instructions (block 1374). Similarly, SON system 250 may then send an instruction to eNodeB 310-B to adjust the maximum number of HARQ transmission (signal 1376) and eNodeB 310-B may adjust the HARQ number based on the received instructions (block 1378).

Thus, as shown in FIG. 13, the HARQ number may be adjusted independently for the originating and terminating sides of the communication session. For example, if there were a coverage gap on the termination side only (e.g., the wireless connection between eNodeB 310-B and UE device 210-B), the HARQ number may be adjusted at the termination side only. In contrast, if both the originating and terminating sides are both experiencing coverage issues, the HARQ number may be adjusted at both sides.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 8, 9, 10, and 11, and a series of signal flows has been described with respect to FIG. 13, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
    selecting a communication session between a wireless communication device and another wireless communication device;
    determining a service requirement for the selected communication session;
    measuring an end-to-end latency for the selected communication session, wherein the end-to-end latency corresponds to a time for a signal to travel from the wireless communication device to the other wireless communication device via a base station, and wherein the end-to-end latency includes an air interface delay between the wireless communication device and the base station;
    computing a repeat requests adjustment value based on a maximum number of repeat requests transmissions, the determined service requirement, and the measured end-to-end latency, wherein the repeat requests adjustment value is computed to ensure that increasing the maximum number of repeat requests transmissions would satisfy a latency requirement specified by the service requirement; and
    sending an instruction to the base station associated with the communication session to adjust the maximum number of repeat requests transmissions based on the computed repeat requests adjustment value, in response to computing the repeat requests adjustment value.

2. The method of claim 1, wherein the repeat requests transmissions correspond to Hybrid Automatic Repeat Requests (HARQs) transmissions.

3. The method of claim 1, wherein determining the service requirement for the selected communication session includes:
    determining a service type associated with the selected communication session; and
    determining the latency requirement, wherein the latency requirement is associated with the determined service type.

4. The method of claim 1, wherein measuring the end-to-end latency for the selected communication session includes at least one of:
    obtaining a packet trace for the communication session, and measuring the end-to-end latency for the selected communication session based on a time the packet trace took to traverse a path associated with the communication session; or
    determining a path for the communication session, wherein the path includes a plurality of links, and measuring the end-to-end latency based on historical latency values associated with the plurality of links.

5. The method of claim 1, wherein computing the repeat requests adjustment value based on the maximum number of repeat requests transmissions, the determined service requirement, and the measured end-to-end latency includes:
    determining whether increasing the maximum number of repeat requests transmissions would increase a resulting end-to-end latency above a latency value specified by the service requirement; and
    increasing the maximum number of repeat requests, in response to determining that increasing the maximum number of repeat requests transmissions would not increase the end-to-end latency above the latency value specified by the service requirement.

6. The method of claim 5, wherein determining whether increasing the maximum number of repeat requests transmissions would increase a resulting end-to-end latency above the latency value specified by the service requirement includes:

determining the resulting end-to-end latency from an empirically determined function that relates values of numbers of repeat requests transmissions to values of latency.

7. The method of claim 1, wherein computing the repeat requests adjustment value based on the maximum number of repeat requests transmissions, the determined service requirement, and the measured end-to-end latency includes:
determining a repeat requests latency associated with the maximum number of repeat requests transmissions;
determining whether the measured end-to-end latency is greater than a first latency threshold and whether the repeat requests latency is greater than a second latency threshold; and
decreasing the maximum number of repeat requests transmissions, in response to determining that the measured end-to-end latency is greater than the first latency threshold and that the repeat requests latency is greater than the second latency threshold.

8. The method of claim 1, wherein computing the repeat requests adjustment value based on the maximum number of repeat requests transmissions, the determined service requirement, and the measured end-to-end latency includes:
determining whether a repeat requests failure rate is below a failure rate threshold; and
decreasing the maximum number of repeat requests transmissions, in response to determining that the repeat requests failure rate is below the failure rate threshold.

9. The method of claim 1, wherein computing the repeat requests adjustment value based on the maximum number of repeat requests transmissions, the determined service requirement, and the measured end-to-end latency includes:
determining whether increasing the maximum number of repeat requests transmissions would result in a lower repeat requests failure rate; and
increasing the maximum number of repeat requests transmissions, in response to determining that increasing the maximum number of repeat requests transmissions would result in the lower repeat requests failure rate.

10. The method of claim 1, wherein sending an instruction to the base station associated with the communication session to adjust the maximum number of repeat requests transmissions based on the computed repeat requests adjustment value further includes:
instructing the base station to adjust a packet sequence reorder timer based on the adjusted maximum number of repeat requests transmissions; and
instructing the base station to adjust a status prohibit timer based on the adjusted packet sequence reorder timer.

11. The method of claim 1, wherein the computer device comprises:
a computer device located in a provider network; or
a computer device located in a wireless access network.

12. A computer device comprising:
a memory configured to store instructions; and
a processor configured to execute the instructions to:
select a communication session between a wireless communication device and another wireless communication device;
determine a service requirement for the selected communication session;
measure an end-to-end latency for the selected communication session, wherein the end-to-end latency corresponds to a time for a signal to travel from the wireless communication device to the other wireless communication device via a base station, and wherein the end-to-end latency includes an air interface delay between the wireless communication device and the base station;
compute a repeat requests adjustment value based on a maximum number of repeat requests transmissions, the determined service requirement, and the measured end-to-end latency, wherein the repeat requests adjustment value is computed to ensure that increasing the maximum number of repeat requests transmissions would satisfy a latency requirement specified by the service requirement; and
instruct a base station associated with the communication session to adjust the maximum number of repeat requests transmissions based on the computed repeat requests adjustment value, in response to computing the repeat requests adjustment value.

13. The computer device of claim 12, wherein, when determining the service requirement for the selected communication session, the processor is further configured to:
determine a service type associated with the selected communication session; and
determine a latency requirement associated with the determined service type.

14. The computer device of claim 12, wherein, when measuring the end-to-end latency for the selected communication session, the processor is further configured to:
obtain a packet trace for the communication session;
determine a path for the communication session, wherein the path includes a plurality of links; and
measure the end-to-end latency based on historical latency values associated with the plurality of links and based on a time the packet trace took to traverse a path associated with the communication session.

15. The computer device of claim 12, wherein, when computing the repeat requests adjustment value based on a maximum number of repeat requests transmissions, the determined service requirement, and the measured end-to-end latency, the processor is further configured to:
determine whether increasing the maximum number of repeat requests transmissions would increase a resulting end-to-end latency above a latency value specified by the service requirement; and
increase the maximum number of repeat requests transmissions, in response to determining that increasing the maximum number of repeat requests transmissions would not increase the end-to-end latency above the latency value specified by the service requirement.

16. The computer device of claim 15, wherein, when determining whether increasing the maximum number of repeat requests transmissions would increase a resulting end-to-end latency above the latency value specified by the service requirement, the processor is further configured to:
obtain a function that relates values of numbers of repeat requests transmissions to values of latency; and
compute the resulting end-to-end latency based on the obtained function.

17. The computer device of claim 12, wherein, when computing the repeat requests adjustment value based on a maximum number of repeat requests transmissions, the determined service requirement, and the measured end-to-end latency, the processor is further configured to:
determine a repeat requests latency associated with the number of repeat requests;
determine whether the measured end-to-end latency is greater than a first latency threshold and whether the repeat requests latency is greater than a second latency threshold; and decrease the maximum number of repeat requests transmissions, in response to determining that the measured end-to-end latency is greater than the first latency threshold and that the repeat requests latency is greater than the second latency threshold.

18. The computer device of claim 12, wherein, when computing the repeat requests adjustment value based on a maximum number of repeat requests transmissions, the determined service requirement, and the measured end-to-end latency, the processor is further configured to:
   determine whether a repeat requests failure rate is below a failure rate threshold; and
   select to not adjust decrease the maximum number of repeat requests transmissions, in response to determining that the repeat requests failure rate is below the failure rate threshold.

19. The computer device of claim 12, wherein, when computing the repeat requests adjustment value based on a maximum number of repeat requests transmissions, the determined service requirement, and the measured end-to-end latency, the processor is further configured to:
   compute whether increasing the maximum number of repeat requests transmissions would result in a lower repeat requests failure rate; and
   increase the maximum number of repeat requests transmissions, in response to computing that increasing the maximum number of repeat requests transmissions would result in the lower repeat requests failure rate.

20. A system comprising:
   a base station configured to provide a wireless connection to a wireless communication device; and
   a network device configured to:
      select a communication session between a wireless communication device and another wireless communication device;
      determine a service requirement for the selected communication session;
      measure an end-to-end latency for the selected communication session, wherein the end-to-end latency corresponds to a time for a signal to travel from the wireless communication device to the other wireless communication device via a base station, and wherein the end-to-end latency includes an air interface delay between the wireless communication device and the base station; and
      compute a repeat requests adjustment value based on a maximum number of repeat requests transmissions, the determined service requirement, and the measured end-to-end latency, wherein the repeat requests adjustment value is computed to ensure that increasing the maximum number of repeat requests transmissions would satisfy a latency requirement specified by the service requirement; and
      instruct the base station to adjust the maximum number of repeat requests transmissions based on the computed repeat requests adjustment value, in response to computing the repeat requests adjustment value;
   wherein the base station is further configured to:
      adjust the maximum number of repeat requests transmissions for the selected communication session based on the received instruction from the network device.

* * * * *